(12) United States Patent
Hsu et al.

(10) Patent No.: US 12,552,751 B2
(45) Date of Patent: Feb. 17, 2026

(54) CRYSTAL FORMS A, B, C, D, E, F AND G OF SELUMETINIB SULFATE AND PREPARATION METHODS THEREOF

(71) Applicant: Chunghwa Chemical Synthesis & Biotech Co. Ltd., New Taipei (TW)

(72) Inventors: Yao-Lung Hsu, New Taipei (TW); Kuang-Chan Hsieh, New Taipei (TW); Hui-Wen Cheng, New Taipei (TW); Zong-Han Yang, New Taipei (TW)

(73) Assignee: CHUNGHWA CHEMICAL SYNTHESIS & BIOTECH CO. LTD., New Taipei (TW)

( * ) Notice: Subject to any disclaimer, the term of this patent is extended or adjusted under 35 U.S.C. 154(b) by 261 days.

(21) Appl. No.: 18/468,027

(22) Filed: Sep. 15, 2023

(65) Prior Publication Data
US 2024/0400519 A1   Dec. 5, 2024

(30) Foreign Application Priority Data
Jun. 1, 2023 (TW) ................................ 112120593

(51) Int. Cl.
C07D 235/06   (2006.01)
(52) U.S. Cl.
CPC ........ C07D 235/06 (2013.01); *C07B 2200/13* (2013.01)

(58) Field of Classification Search
CPC .................... C07D 235/06; C07B 2200/13
See application file for complete search history.

(56) References Cited

U.S. PATENT DOCUMENTS 9,156,795 B2 * 10/2015 DeMattei ............. C07D 235/06

FOREIGN PATENT DOCUMENTS

| CN | 101486682 | 7/2009 |
| CN | 101633645 | 1/2010 |
| WO | WO2007076245 | 7/2007 |

* cited by examiner

*Primary Examiner* — Timothy R Rozof
(74) *Attorney, Agent, or Firm* — MUNCY, GEISSLER, OLDS & LOWE, P.C.

(57) ABSTRACT

The present invention relates to crystal forms of A, B, C, D, E, F and G of selumetinib sulfate and the preparation method thereof. The crystal forms A, B and F of selumetinib sulfate are obtained by adding 6-(4-Bromo-2-chloro-phenylamino)-7-fluoro-3-methyl-3H-benzoimidazole-5-carboxylic acid (2-vinyloxy-ethoxy)-amide (SEL-3) into an organic solvent; further, crystal form A of selumetinib sulfate can be as a raw material to prepare crystal forms C, D and E of selumetinib sulfate, and crystal form C of selumetinib sulfate can be as a raw material to prepare crystal form G of selumetinib sulfate.

10 Claims, 7 Drawing Sheets

CRYSTAL FORMS A, B, C, D, E, F AND G OF SELUMETINIB SULFATE AND PREPARATION METHODS THEREOF

BACKGROUND OF THE INVENTION

1. Technical Field

The present invention relates to crystal forms A, B, C, D, E, F and G of selumetinib sulfate and their respective preparation methods.

2. Description of Related Art

Selumetinib sulfate, also known by the trade name Koselugo, is used as an inhibitor of mitogen-activated protein kinase kinases 1 and 2 (MEK1 and 2) and is an orphan drug for pediatric patients with neurofibromatosis who are at least two years old. It was approved by the United States Food and Drug Administration (FDA) in April 2020 and is the first drug approved by the FDA to treat a genetic disorder of the nervous system. While the market has already been supplied with such MEK inhibitor drugs as Mekinist of Novartis (with trametinib as the active ingredient), Mektovi of Pfizer (with binimetinib as the active ingredient) and Zelboraf of Roche (with vemurafenib as the active ingredient), all these drugs are licensed for use to treat melanoma and have no therapeutic effect on neurofibromatosis. Only selumetinib sulfate can treat type I neurofibromatosis (NF1), which is an autosomal dominant disorder.

Selumetinib sulfate has a molecular weight of 555.76 and the molecular formula $C_{17}H_{17}BrClFN_4O_7S$. According to an assessment report by the European Medicines Agency, selumetinib sulfate is a non-hygroscopic solid of a white to yellow color, has very low solubility in water, is slightly soluble in ethanol and acetonitrile, is monocrystalline and will not change its crystal form because of a solvent residue.

Prior art such as U.S. Pat. No. 9,156,795 granted to Array Biopharma Inc. and AstraZeneca AB discloses a crystal form of selumetinib sulfate whose characteristic peaks are observed at 2θ=12.24°, 17.02°, 20.97°, 22.50°, 23.49°, 23.99°, 24.30°, 24.59°, 25.91° and 27.65°, and whose preparation methods involve the use of tetrahydrofuran or butanone as an organic solvent and include crystallization in water under high and low temperatures in order to obtain a single crystal form. More specifically, U.S. Pat. No. 9,156,795 uses two methods to prepare selumetinib (SEL) with a conjugate acid from SEL without a conjugate acid. One of the two methods includes adding sulfuric acid into butanone and water, and the other method includes adding sulfuric acid into tetrahydrofuran and water.

Prior art such as PCT Published Patent Application No. WO2007076245, Chinese Patent No. 101633645 and Chinese Patent No. 101486682 discloses a method for preparing SEL without a conjugate acid, wherein the method includes dissolving 6-(4-bromo-2-chloro-phenylamino)-7-fluoro-3-methyl-3H-benzimidazole-5-carboxylic acid (2-vinyloxy-ethoxy)-amide in methanol, removing the vinyl protecting group with hydrochloric acid for one hour, neutralizing the reactant mixture to pH7, performing reduced-pressure concentration, and extracting SEL without a conjugate acid using ethyl acetate and water.

BRIEF SUMMARY OF THE INVENTION

As stated above, Chinese Patent No. 101633645 and Chinese Patent No. 101486682 disclose the preparation of SEL without a conjugate acid. Moreover, it can be known from the disclosure of these two Chinese patents and U.S. Pat. No. 9,156,795 that it is feasible to first apply the method of the two Chinese patents to preparing SEL without a conjugate acid, and then apply the method of the US patent to preparing SEL containing a conjugate acid. However, a careful evaluation based on scientific research knowledge reveals that this method of preparing SEL without a conjugate acid can be extremely complicated, for it is required to remove the vinyl protecting group with hydrochloric acid, then neutralize the reactant mixture into a conjugate acid-free form, and then add sulfuric acid into the mixture to form selumetinib sulfate.

In addition, the crystal form of an active pharmaceutical ingredient dictates the physical properties, chemical properties, melting point, dissolution rate and optical properties of the ingredient and therefore affects the stability, solubility and bioavailability of a preparation containing the ingredient. This explains why a preparation containing a certain active pharmaceutical ingredient must be prepared with a specific stable crystal form of the ingredient in order to ensure the accuracy and specificity of drug activity.

To solve the problem of operational complexity of the prior art and provide a stable crystal form of selumetinib sulfate that can be used to prepare a preparation containing selumetinib sulfate as an active pharmaceutical ingredient, the present invention provides crystal forms A, B, C, D, E, F and G of selumetinib sulfate and their respective preparation methods.

The present invention, on the one hand, provides a crystal form A of selumetinib sulfate, characterized by having characteristic peaks at 2θ=6.62°±0.20°, 9.64°±0.20°, 12.34°±0.20°, 13.19°±0.20°, 18.00°±0.20°, 21.17°±0.20°, 22.14°±0.20°, 24.85°±0.20° and 26.53°±0.20° in an X-ray powder diffraction (XRPD) pattern. In one preferred embodiment, wherein the XRPD pattern is essentially the same as shown in FIG. 1.

The present invention, on the other hand, provides a crystal form B of selumetinib sulfate, characterized by having characteristic peaks at 2θ=8.56°±0.20°, 12.19°±0.20°, 12.87°±0.20°, 13.33°±0.20°, 16.72°±0.20°, 16.99°±0.20°, 19.28°±0.20°, 20.90°±0.20°, 22.45°±0.20°, 24.52°±0.20°, 25.90°±0.20° and 27.60°±0.20° in an X-ray powder diffraction (XRPD) pattern. In one preferred embodiment, wherein the XRPD pattern is essentially the same as shown in FIG. 2.

The present invention, on the other hand, provides a crystal form C of selumetinib sulfate, characterized by having characteristic peaks at 2θ=6.76°±0.20°, 7.52°±0.20°, 9.39°±0.20°, 11.22°±0.20°, 11.84°±0.20°, 13.52°±0.20°, 16.02°±0.20°, 18.83°±0.20°, 20.34°±0.20°, 23.39°±0.20° and 28.54°±0.20° in an X-ray powder diffraction (XRPD) pattern. In one preferred embodiment, wherein the XRPD pattern is essentially the same as shown in FIG. 3.

The present invention, on the other hand, provides a crystal form D of selumetinib sulfate, characterized by having characteristic peaks at 2θ=6.17°±0.20°, 7.65°±0.20°, 9.79°±0.20°, 14.25°±0.20°, 16.41°±0.20°, 19.20°±0.20°, 22.89°±0.20°, 25.99°±0.20° and 27.22°±0.20° in an X-ray powder diffraction (XRPD) pattern. In one preferred embodiment, wherein the XRPD pattern is essentially the same as shown in FIG. 4.

The present invention, on the other hand, provides a crystal form E of selumetinib sulfate, characterized by having characteristic peaks at 2θ=6.09°±0.20°, 7.63°±0.20°, 9.21°±0.20°, 9.77°±0.20°, 11.69°±0.20°, 12.22°±0.20°, 13.49°±0.20°, 15.59°±0.20°, 16.72°±0.20°, 17.09°±0.20°, 17.64°±0.20°, 18.52°±0.20°, 19.57°±0.20°, 22.43°±0.20°, 23.03°±0.20°, 26.18°±0.20° and 27.20°±0.20° in an X-ray powder diffraction (XRPD) pattern. In one preferred embodiment, wherein the XRPD pattern is essentially the same as shown in FIG. 5.

The present invention, on the other hand, provides a crystal form F of selumetinib sulfate, characterized by having characteristic peaks at 2θ=9.17°±0.20°, 11.37°±0.20°, 12.19°±0.20°, 15.19°±0.20°, 16.72°±0.20°, 17.26°±0.20°, 19.04°±0.20°, 22.01°±0.20°, 24.50°±0.20°, 27.44°±0.20°, 28.02°±0.20°, 32.11°±0.20°, 33.84°±0.20° and 38.61°±0.20° in an X-ray powder diffraction (XRPD) pattern. In one preferred embodiment, wherein the XRPD pattern is essentially the same as shown in FIG. 6.

The present invention, on the other hand, provides a crystal form G of selumetinib sulfate, characterized by having characteristic peaks at 2θ=12.19°±0.20°、13.32°±0.20°、16.70°±0.20°、16.99°±0.20°、19.27°±0.20°、20.90°±0.20°、21.51°±0.20°、22.44°±0.20°、22.83°±0.20°、23.43°±0.20°、23.92°±0.20°、24.51°±0.20°、25.44°±0.20°、25.89°±0.20°、27.58°±0.20°、28.54°±0.20° and 31.68°±0.20° in an X-ray powder diffraction (XRPD) pattern. In one preferred embodiment, wherein the XRPD pattern is essentially the same as shown in FIG. 7.

The present invention, on the other hand, provides a method for preparing the crystal form A of selumetinib sulfate as claimed in claim 1, comprising the steps of: adding the compound 6-(4-bromo-2-chloro-phenylamino)-7-fluoro-3-methyl-3H-benzimidazole-5-carboxylic acid (2-vinyloxy-ethoxy)-amide (SEL-3) into a first organic solvent to form a solution, increasing a temperature of the solution to enhance dissolution, then decreasing the temperature of the solution to facilitate crystallization and thereby obtaining the crystal form A of selumetinib sulfate.

In one preferred embodiment, wherein the first organic solvent includes water, tetrahydrofuran and sulfuric acid, and the sulfuric acid has a concentration of 5%-15% V/V.

The present invention, on the other hand, provides a method for preparing the crystal form B of selumetinib sulfate as claimed in claim 3, comprises the steps of: adding the compound 6-(4-bromo-2-chloro-phenylamino)-7-fluoro-3-methyl-3H-benzimidazole-5-carboxylic acid (2-vinyloxy-ethoxy)-amide (SEL-3) into a second organic solvent to form a solution, increasing a temperature of the solution to enhance dissolution, then decreasing the temperature of the solution to facilitate crystallization and thereby obtaining the crystal form B of selumetinib sulfate.

In one preferred embodiment, wherein the second organic solvent includes water, tetrahydrofuran and sulfuric acid, and the sulfuric acid has a concentration of 45%-55% V/V.

The present invention, on the other hand, provides a method for converting the crystal form A of selumetinib sulfate into the crystal form C of selumetinib sulfate, the crystal form D of selumetinib sulfate or the crystal form E of selumetinib sulfate, comprising the steps of: adding the crystal form A of selumetinib sulfate into a third organic solvent and water to form a solution, increasing a temperature of the solution to enhance dissolution, then decreasing the temperature of the solution to facilitate crystallization and thereby obtaining the crystal form C, D or E of selumetinib sulfate.

In one preferred embodiment, wherein the crystal form C of selumetinib sulfate is obtainable when the third organic solvent is (1) acetone and dichloromethane, (2) butanone and isopropyl alcohol, (3) butanone and methanol, (4) butanone or (5) acetone.

In one preferred embodiment, wherein the crystal form D of selumetinib sulfate is obtainable when the third organic solvent is (1) butanone and dichloromethane or (2) butanol.

In one preferred embodiment, wherein the crystal form E of selumetinib sulfate is obtainable when the third organic solvent is isopropyl alcohol.

The present invention, on the other hand, provides a method for preparing the crystal form F of selumetinib sulfate as claimed in claim 9, comprises the steps of: adding the compound 6-(4-bromo-2-chloro-phenylamino)-7-fluoro-3-methyl-3H-benzimidazole-5-carboxylic acid (2-vinyloxy-ethoxy)-amide (SEL-3) into a fourth organic solvent to form a first solution, adding the first solution into a fifth organic solvent to form a second solution; increasing a temperature of the second solution to enhance dissolution, then decreasing the temperature of the second solution to facilitate crystallization and thereby obtaining the crystal form F of selumetinib sulfate.

In one preferred embodiment, wherein the fourth organic solvent is ethanol and hydrochloric acid.

In one preferred embodiment, wherein the fifth organic solvent is water and tetrahydrofuran.

The present invention, on the other hand, provides a method for converting the crystal form C of selumetinib sulfate into the crystal form G of selumetinib sulfate, comprising the steps of: adding the crystal form C of selumetinib sulfate into a sixth organic solvent and then into a seventh organic solvent, decreasing the temperature of the solution to facilitate crystallization and thereby obtaining the crystal form G of selumetinib sulfate.

In one preferred embodiment, wherein the sixth organic solvent is butanone, water and sulfuric acid, and the sulfuric acid has a concentration of 5%-15% V/V.

In one preferred embodiment, wherein the seventh organic solvent is butanone.

Disclosed herein are seven different crystal forms of selumetinib sulfate and their respective preparation methods. The disclosed crystal forms and preparation methods are different from the crystal forms and preparation methods disclosed in Chinese Patent No. 101633645, Chinese Patent No. 101486682 and U.S. Pat. No. 9,156,795. The present invention uses sulfuric acid to remove the vinyl protecting group, so selumetinib sulfate can be obtained without having to neutralize the reactant mixture into a conjugate acid-free form. Furthermore, in contrast to the preparation method of the Chinese patents, in which the unnecessary reagent residues cannot be removed until a post-treatment such as a neutralization and extraction step is performed on the resulting SEL without a conjugate acid, the present invention removes the vinyl protecting group with sulfuric acid and takes advantage of the differences in solubility of the conjugate acid form in different organic solvents so that recrystallization can be carried out directly to obtain the desired crystal form. The preparation methods of the present invention not only include fewer steps than the prior art, but also can remove excessive impurities. The novel methods of the present invention have never been disclosed before and cannot be executed through intuitive operation like the prior art. Moreover, the disclosed crystal forms B, C, D, E, F and G of selumetinib sulfate are stable, can be easily stored and can each serve as an active pharmaceutical ingredient in a preparation, whereas the disclosed crystal form A of selumetinib sulfate can be used as a raw material to prepare the other crystal forms. The preparation methods of the invention can increase the yield of selumetinib sulfate in different crystal forms and contribute greatly to the pharmaceutical industry by using fewer reaction steps than the prior art to reduce the production cost and labor cost incurred in the preparation process.

DETAILED DESCRIPTION OF THE INVENTION

Figure 1:
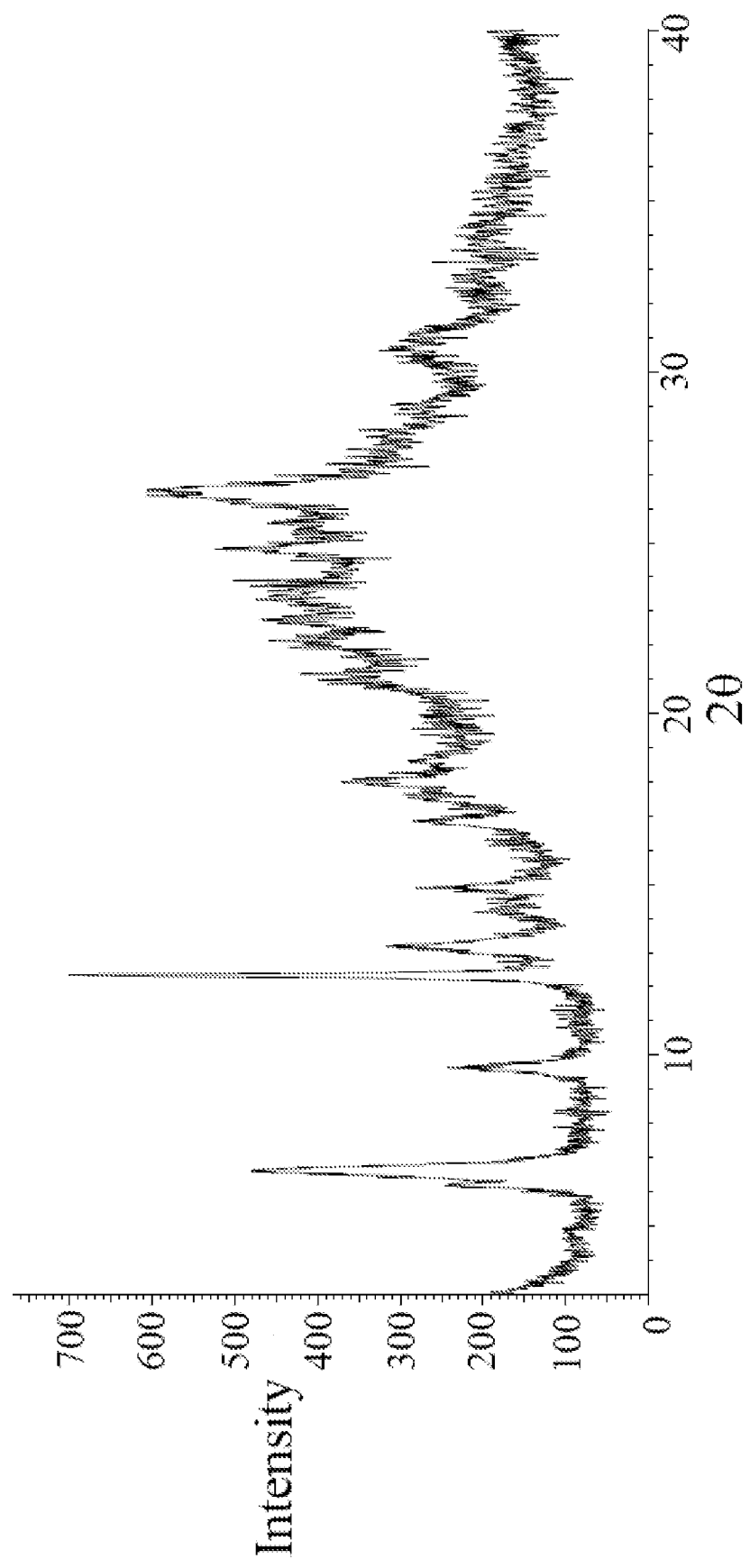
FIG. 1 is an X-ray powder diffraction (XRPD) pattern of the crystal form A of selumetinib sulfate according to an embodiment of the present invention.

The implementation modes described below should not be construed as imposing excessive limitations on the present invention. A person of ordinary skill in the art may modify or change the embodiments discussed herein without departing from the spirit or scope of the invention, and all such modifications and changes shall fall within the scope of the invention.

As used herein, the indefinite article "a"/"an" indicates that the number of the object modified by the article may be one or more than one (i.e., at least one).

Crystal Forms A, B, C, D, E, F and G of Selumetinib Sulfate

The crystal form A of selumetinib sulfate according to the present invention is characterized in that its characteristic peaks in an XRPD pattern are observed at $2\theta=6.62°\pm0.20°$, $9.64°\pm0.20°$, $12.34°\pm0.20°$, $13.19°\pm0.20°$, $18.00°\pm0.20°$, $21.17°\pm0.20°$, $22.14°\pm0.20°$, $24.85°\pm0.20°$ and $26.53°\pm0.20°$. The XRPD pattern of the crystal form A of selumetinib sulfate is essentially the same as that shown in FIG. 1.

The crystal form B of selumetinib sulfate according to the present invention is characterized in that its characteristic peaks in an XRPD pattern are observed at $2\theta=8.56°\pm0.20°$, $12.19°\pm0.20°$, $12.87°\pm0.20°$, $13.33°\pm0.20°$, $16.72°\pm0.20°$, $16.99°\pm0.20°$, $19.28°\pm0.20°$, $20.90°\pm0.20°$, $22.45°\pm0.20°$, $24.52°\pm0.20°$, $25.90°\pm0.20°$ and $27.60°\pm0.20°$. The XRPD pattern of the crystal form B of selumetinib sulfate is essentially the same as that shown in FIG. 2.

The crystal form C of selumetinib sulfate according to the present invention is characterized in that its characteristic peaks in an XRPD pattern are observed at $2\theta=6.76°\pm0.20°$, $7.52°\pm0.20°$, $9.39°\pm0.20°$, $11.22°\pm0.20°$, $11.84°\pm0.20°$, $13.52°\pm0.20°$, $16.02°\pm0.20°$, $18.83°\pm0.20°$, $20.34°\pm0.20°$, $23.39°\pm0.20°$ and $28.54°\pm0.20°$. The XRPD pattern of the crystal form C of selumetinib sulfate is essentially the same as that shown in FIG. 3.

The crystal form D of selumetinib sulfate according to the present invention is characterized in that its characteristic peaks in an XRPD pattern are observed at $2\theta=6.17°\pm0.20°$, $7.65°\pm0.20°$, $9.79°\pm0.20°$, $14.25°\pm0.20°$, $16.41°\pm0.20°$, $19.20°\pm0.20°$, $22.89°\pm0.20°$, $25.99°\pm0.20°$ and $27.22°\pm0.20°$. The XRPD pattern of the crystal form D of selumetinib sulfate is essentially the same as that shown in FIG. 4.

The crystal form E of selumetinib sulfate according to the present invention is characterized in that its characteristic peaks in an XRPD pattern are observed at $2\theta=6.09°\pm0.20°$, $7.63°\pm0.20°$, $9.21°\pm0.20°$, $9.77°\pm0.20°$, $11.69°\pm0.20°$, $12.22°\pm0.20°$, $13.49°\pm0.20°$, $15.59°\pm0.20°$, $16.72°\pm0.20°$, $17.09°\pm0.20°$, $17.64°\pm0.20°$, $18.52°\pm0.20°$, $19.57°\pm0.20°$, $22.43°\pm0.20°$, $23.03°\pm0.20°$, $26.18°\pm0.20°$ and $27.20°\pm0.20°$. The XRPD pattern of the crystal form E of selumetinib sulfate is essentially the same as that shown in FIG. 5.

The crystal form F of selumetinib sulfate according to the present invention is characterized in that its characteristic peaks in an XRPD pattern are observed at $2\theta=9.17°\pm0.20°$, $11.37°\pm0.20°$, $12.19°\pm0.20°$, $15.19°\pm0.20°$, $16.72°\pm0.20°$, $17.26°\pm0.20°$, $19.04°\pm0.20°$, $22.01°\pm0.20°$, $24.50°\pm0.20°$, $27.44°\pm0.20°$, $28.02°\pm0.20°$, $32.11°\pm0.20°$, $33.84°\pm0.20°$ and $38.61°\pm0.20°$. The XRPD pattern of the crystal form F of selumetinib sulfate is essentially the same as that shown in FIG. 6.

The crystal form G of selumetinib sulfate according to the present invention is characterized in that its characteristic peaks in an XRPD pattern are observed at $2\theta=12.19°\pm0.20°$、 $13.32°\pm0.20°$、 $16.70°\pm0.20°$、 $16.99°\pm0.20°$ 、 $19.27°\pm0.20°$、 $20.90°\pm0.20°$、 $21.51°\pm0.20°$ 、 $22.44°\pm0.20°$、 $22.83°\pm0.20°$、 $23.43°\pm0.20°$ 、 $23.92°\pm0.20°$、 $24.51°\pm0.20°$、 $25.44°\pm0.20°$ 、 $25.89°\pm0.20°$、 $27.58°\pm0.20°$、 $28.54°\pm0.20°$ and $31.68°\pm0.20°$. The XRPD pattern of the crystal form F of selumetinib sulfate is essentially the same as that shown in FIG. 7.

Preparation Methods of Crystal Forms A, B, C, D, E, F and G of Selumetinib Sulfate The method for preparing crystal form A of selumetinib sulfate according to the present invention includes the following steps. To begin with, the compound 6-(4-bromo-2-chloro-phenylamino)-7-fluoro-3-methyl-3H-benzimidazole-5-carboxylic acid (2-vinyloxy-ethoxy)-amide (hereinafter referred to as compound SEL-3, or SEL-3 for short) is added into a first organic solvent in order to remove the vinyl protecting group of SEL-3 and convert the vinyloxy group of SEL-3 into a hydroxyl group. After that, the temperature of the solution is increased to enhance dissolution, and then the temperature of the solution is lowered to facilitate crystallization so that crystal form A of selumetinib sulfate can be obtained. The process flow of the preparation method is as follows:

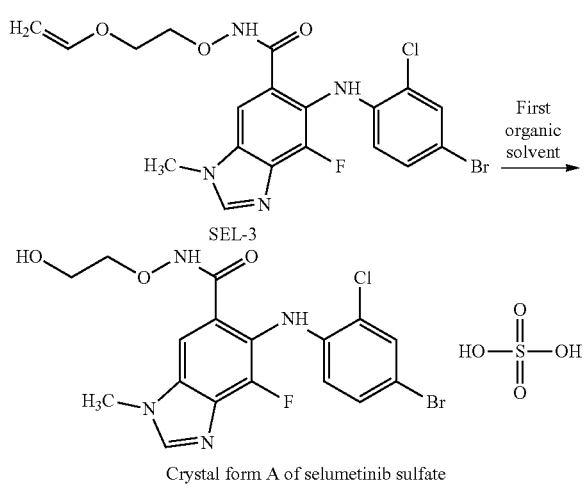

Crystal form A of selumetinib sulfate

In some embodiments, the first organic solvent includes water, tetrahydrofuran and sulfuric acid, and the concentration of the sulfuric acid is preferably 5%-15% V/V (such as but not limited to 5%, 10% or 15% V/V) in order to obtain crystal form A of selumetinib sulfate. Moreover, the inventor has confirmed through experiments that the amount of the solvent added has no effect on the crystal form obtained.

The method for preparing crystal form B of selumetinib sulfate according to the present invention includes the following steps. To begin with, compound SEL-3 is added into a second organic solvent in order to remove the vinyl protecting group of SEL-3 and convert the vinyloxy group of SEL-3 into a hydroxyl group. After that, the temperature of the solution is increased to enhance dissolution, and then the temperature of the solution is lowered to facilitate crystallization so that crystal form B of selumetinib sulfate can be obtained. The process flow of the preparation method is as follows:

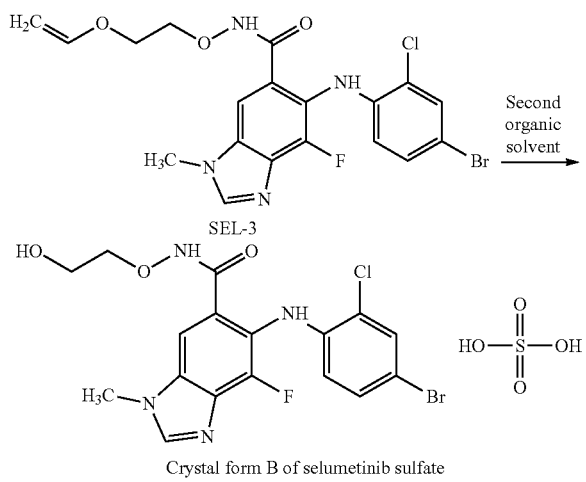

Crystal form B of selumetinib sulfate

In some embodiments, the second organic solvent is water, tetrahydrofuran and sulfuric acid, and the concentration of the sulfuric acid is preferably 45%-55% V/V (such as but not limited to 45%, 50% or 55% V/V) in order to obtain crystal form B of selumetinib sulfate. Moreover, the inventor has confirmed through experiments that the amount of the solvent added has no effect on the crystal form obtained.

In some embodiments, the foregoing method for preparing crystal form A of selumetinib sulfate may be extended to further include the steps of: adding the crystal form A of selumetinib sulfate into a third organic solvent, increasing the temperature of the solution to enhance dissolution, then lowering the temperature of the solution to facilitate crystallization so that crystal form C, D or E of selumetinib sulfate can be obtained. The process flow of the additional steps is as follows:

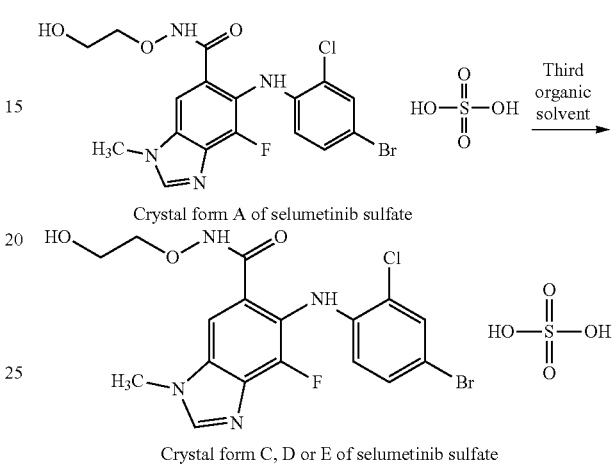

Crystal form C, D or E of selumetinib sulfate

In some embodiments, crystal form C of selumetinib sulfate can be obtained when the third organic solvent is (1) acetone and dichloromethane, (2) butanone and isopropyl alcohol, (3) butanone and methanol, (4) butanone or (5) acetone. In some other embodiments, crystal form D of selumetinib sulfate can be obtained when the third organic solvent is (1) butanone and dichloromethane or (2) butanol. In some other embodiments, crystal form E of selumetinib sulfate can be obtained when the third organic solvent is isopropyl alcohol. Moreover, the inventor has confirmed through experiments that the amount of the solvent added has no effect on the crystal form obtained.

The method for preparing crystal form F of selumetinib sulfate according to the present invention includes the following steps. To begin with, compound SEL-3 is added into a fourth organic solvent to form a first solution, and then the first solution is added into a fifth organic solvent in order to remove the vinyl protecting group of SEL-3 and convert the vinyloxy group of SEL-3 into a hydroxyl group to form a second solution. After that, the temperature of the second solution is increased to enhance dissolution, and then the temperature of the second solution is lowered to facilitate crystallization so that crystal form F of selumetinib sulfate can be obtained. The process flow of the preparation method is as follows:

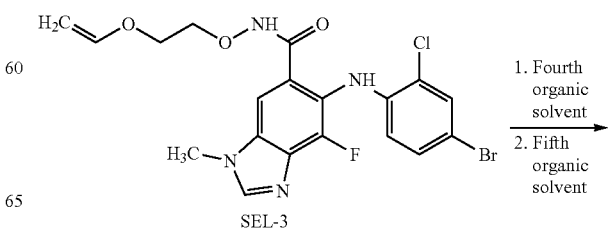

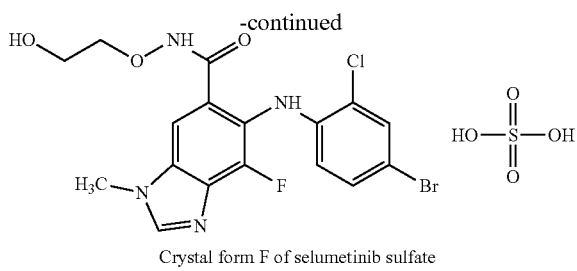

Crystal form F of selumetinib sulfate

In some embodiments, the fourth organic solvent is ethanol and hydrochloric acid. In some other embodiments, the fifth organic solvent is water and tetrahydrofuran. In a preferred embodiment, the fourth organic solvent is ethanol and hydrochloric acid while the fifth organic solvent is water and tetrahydrofuran. Moreover, the inventor has confirmed through experiments that the amounts of the solvents added have no effect on the crystal form obtained.

In some embodiments, the foregoing method for preparing crystal form C of selumetinib sulfate may be extended to further include the steps of: adding the crystal

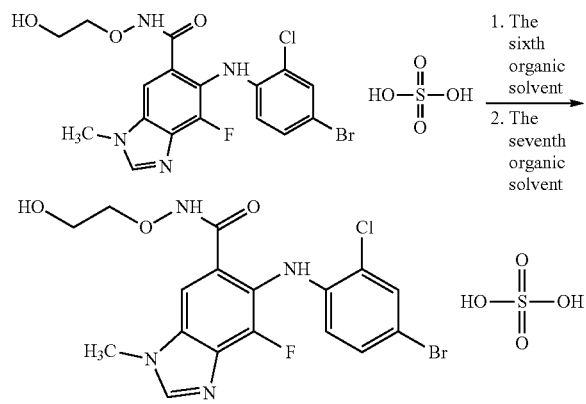

form C of selumetinib sulfate into a sixth organic solvent and then into a seventh organic solvent, decreasing the temperature of the solution to facilitate crystallization so that the crystal form G of selumetinib sulfate can be obtained. The process flow of the additional steps is as follow:

Crystal form C of selumetinib sulfate Crystal form G of selumetinib sulfate

In some embodiments, the sixth organic solvent is butanone, water and sulfuric acid, and the concentration of the sulfuric acid is preferably 5%-15% V/V (such as but not limited to 5, 10 or 15% V/V) in order to obtain crystal form G of selumetinib sulfate. In other embodiments, the seventh organic solvent is butanone. In one preferred embodiment, the sixth organic solvent is butanone, water and sulfuric acid, and the concentration of the sulfuric acid is 5%-15% V/V, and the seventh organic solvent is butanone. Moreover, the inventor has confirmed through experiments that the amount of the solvent added has no effect on the crystal form obtained.

Another aspect of the present invention relates to a pharmaceutical composition that includes any one, or a combination of at least two, of crystal form A of selumetinib sulfate, crystal form B of selumetinib sulfate, crystal form C of selumetinib sulfate, crystal form D of selumetinib sulfate, crystal form E of selumetinib sulfate, crystal form F of selumetinib sulfate and crystal form G of selumetinib sulfate, along with a pharmaceutically acceptable carrier, diluting agent, or recipient.

The form and type of the pharmaceutical composition may be those commonly used with a pharmaceutical composition, including tablet, powder, capsule, suppository, suspension, liposome and spray.

The form and type of the carrier, diluting agent, or recipient may be those commonly used in the pharmaceutical field, and the present invention has no limitation in this regard.

EMBODIMENTS

Embodiment 1: Preparation of Crystal Form A of Selumetinib Sulfate 6.068 g of SEL-3 was added with 75 mL of tetrahydrofuran and 115 mL of water. The temperature of the solution was lowered while the solution was stirred. When the temperature of the solution was in the range from 5° C. to 15° C., 14.72 mL of a 10% aqueous solution of sulfuric acid was added, and stirring continued for 10 minutes. The temperature of the solution was then raised while the solution was stirred. Complete dissolution did not occur until the temperature was 45° C., and the reflux state was reached when the temperature was 55° C., at which time the raising of temperature was stopped. When the temperature of the solution was lowered to 30° C., a certain amount of solid precipitated. When the temperature was further reduced to 16° C., a large amount of precipitates was found. The solution was then stirred for one hour, during which time the temperature of the solution was kept in the range from 0° C. to 10° C. After that, suction filtration was performed on the solution, and the solid obtained was washed with 50 mL of water and then dried at 55° C. for 19 hours to produce 4.548 g of pale yellow solid, with the yield being 65.33% and the purity of the product being 99.18%. An XRPD pattern of the product is shown in FIG. 1.

Figure 2:
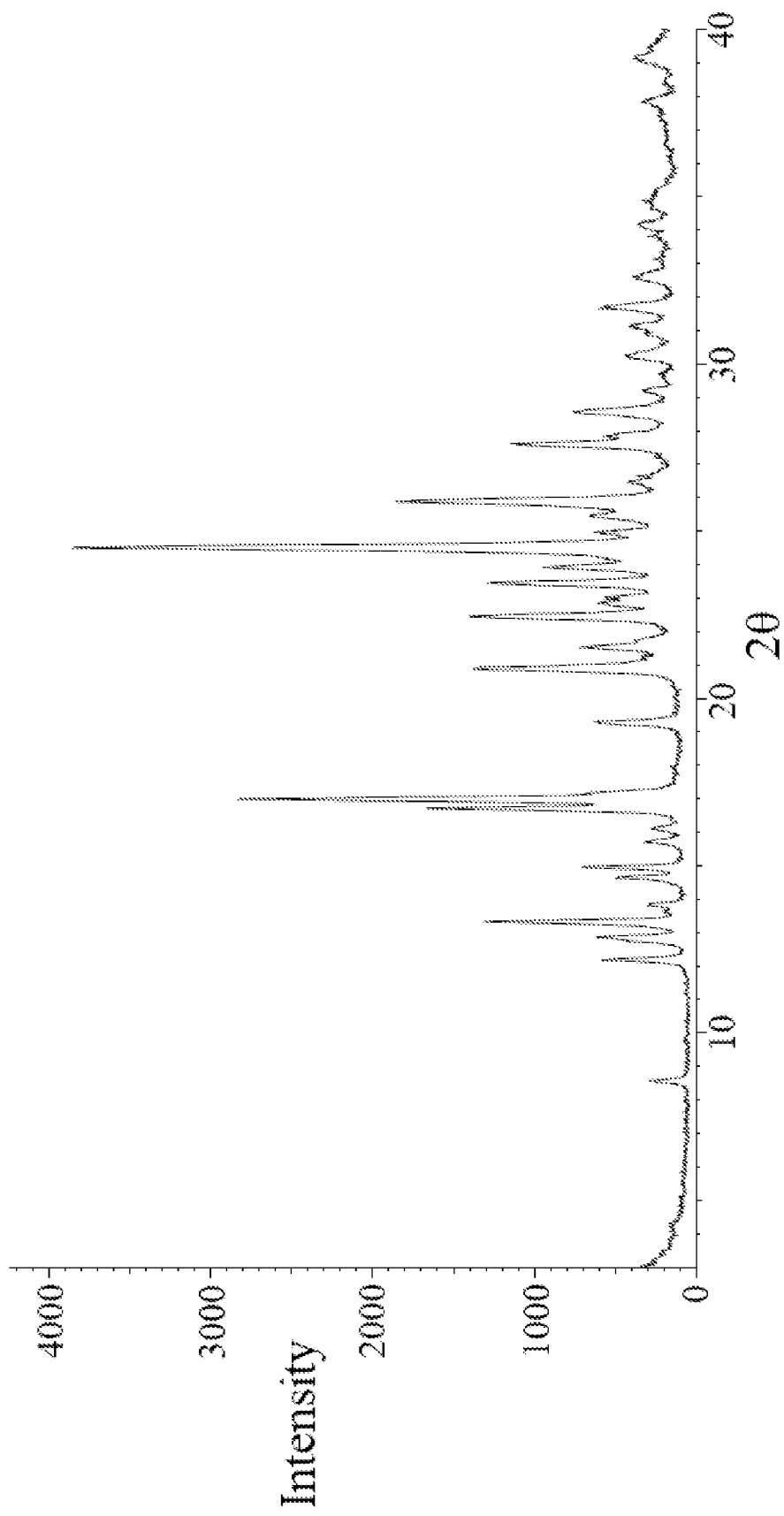
FIG. 2 is an XRPD pattern of the crystal form B of selumetinib sulfate according to an embodiment of the present invention.

Embodiment 2: Preparation of Crystal Form B of Selumetinib Sulfate 0.9157 g of SEL-3 was added with 13.7 mL of tetrahydrofuran. The temperature of the solution was lowered while the solution was stirred. When the temperature of the solution was in the range from 5° C. to 15° C., 0.444 mL of a 50% aqueous solution of sulfuric acid was added, and the temperature of the solution was brought back to 25° C. to 30° C. After stirring for two hours, suction filtration was performed on the solution, and the solid obtained was washed twice with 9.2 mL of dichloromethane and then dried at 55° C. for 15 hours to produce 0.356 g of pale yellow solid, with the yield being 81.6% and the purity of the product being 98.54%. An XRPD pattern of the product is shown in FIG. 2.

Figure 3:
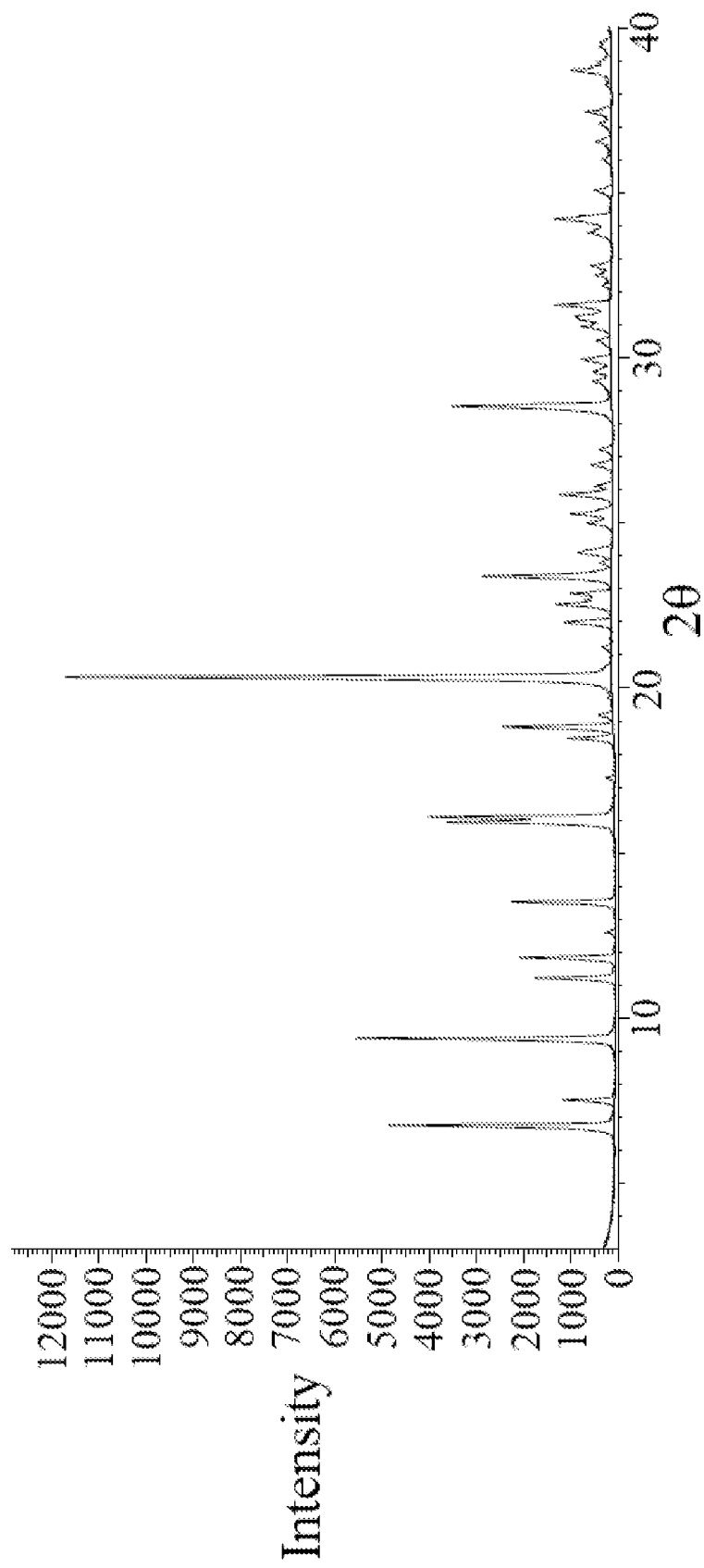
FIG. 3 is an XRPD pattern of the crystal form C of selumetinib sulfate according to an embodiment of the present invention.

Embodiment 3: Preparation of Crystal Form C of Selumetinib Sulfate 0.668 g of crystal form A was added with 13.4 mL of acetone, 6.7 mL of dichloromethane and 3.4 mL of water. The temperature of the solution was raised while the solution was stirred, and the raising of temperature was stopped when 51° C. was reached. When the temperature of the solution was subsequently lowered to 34° C., a certain amount of solid precipitated. The temperature was further reduced, and the solution was stirred for one hour while its temperature was kept in the range from 0° C. to 10° C. After that, suction filtration was performed on the solution, and the solid obtained was washed with 13.4 mL of water and then dried at 55° C. for 18 hours to produce 0.277 g of pale yellow solid, with the yield being 41.4% and the purity of the product being 98.31%. An XRPD pattern of the product is shown in FIG. 3.

Embodiment 4: Preparation of Crystal Form C of Selumetinib Sulfate 0.302 g of crystal form A was added with 3 mL of butanone, 1.5 mL of isopropyl alcohol and 1.5 mL of water. The temperature of the solution was raised while the solution was stirred, and complete dissolution did not occur until the temperature was 75° C., at which time the raising of temperature was stopped. A certain amount of solid precipitated when the temperature was lowered to 38° C., and then the solution was stirred for one hour while its temperature was kept in the range from 0° C. to 10° C. After that, suction filtration was performed on the solution, and the solid obtained was washed with 6 mL of water and then dried at 55° C. for 18 hours to produce 0.183 g of pale yellow solid, with the yield being 61.00% and the purity of the product being 98.49%.

Embodiment 5: Preparation of Crystal Form C of Selumetinib Sulfate 0.302 g of crystal form A was added with 3 mL of butanone, 1.5 mL of methanol and 1.5 mL of water. The temperature of the solution was raised while the solution was stirred, and complete dissolution did not occur until the temperature was 70° C., at which time the raising of temperature was stopped. A certain amount of solid precipitated when the temperature was lowered to 47° C., and then the solution was stirred for one hour while its temperature was kept in the range from 0° C. to 10° C. After that, suction filtration was performed on the solution, and the solid obtained was washed with 6 mL of water and then dried at 55° C. for 18 hours to produce 0.219 g of pale yellow solid, with the yield being 72.80% and the purity of the product being 98.45%.

Embodiment 6: Preparation of Crystal Form C of Selumetinib Sulfate 0.721 g of crystal form A was added with 7.21 mL of butanone and 3.61 mL of water. The temperature of the solution was raised while the solution was stirred, and the raising of temperature was stopped when the reflux state was reached. The solution was subsequently cooled down and was stirred for one hour while its temperature was kept in the range from 0° C. to 10° C. After that, suction filtration was performed on the solution, and the solid obtained was washed with 10 mL of water and then dried at 55° C. for 15 hours to produce 0.679 g of pale yellow to white solid, with the yield being 94.60% and the purity of the product being 99.72%.

Embodiment 7: Preparation of Crystal Form C of Selumetinib Sulfate 0.504 g of crystal form A was added with 14.1 mL of acetone and 5 mL of water. The temperature of the solution was raised while the solution was stirred, and complete dissolution did not occur until the temperature was 60° C., at which time the raising of temperature was stopped. A large amount of solid precipitated when the temperature was lowered to −1° C., and the solution was stirred for one hour while its temperature was kept in the range from −5° C. to 5° C. After that, suction filtration was performed on the solution, and the solid obtained was washed with 5 mL of water and then dried at 55° C. for 16 hours to produce 0.191 g of pale yellow solid, with the yield being 37.89% and the purity of the product being 99.06%.

Figure 4:
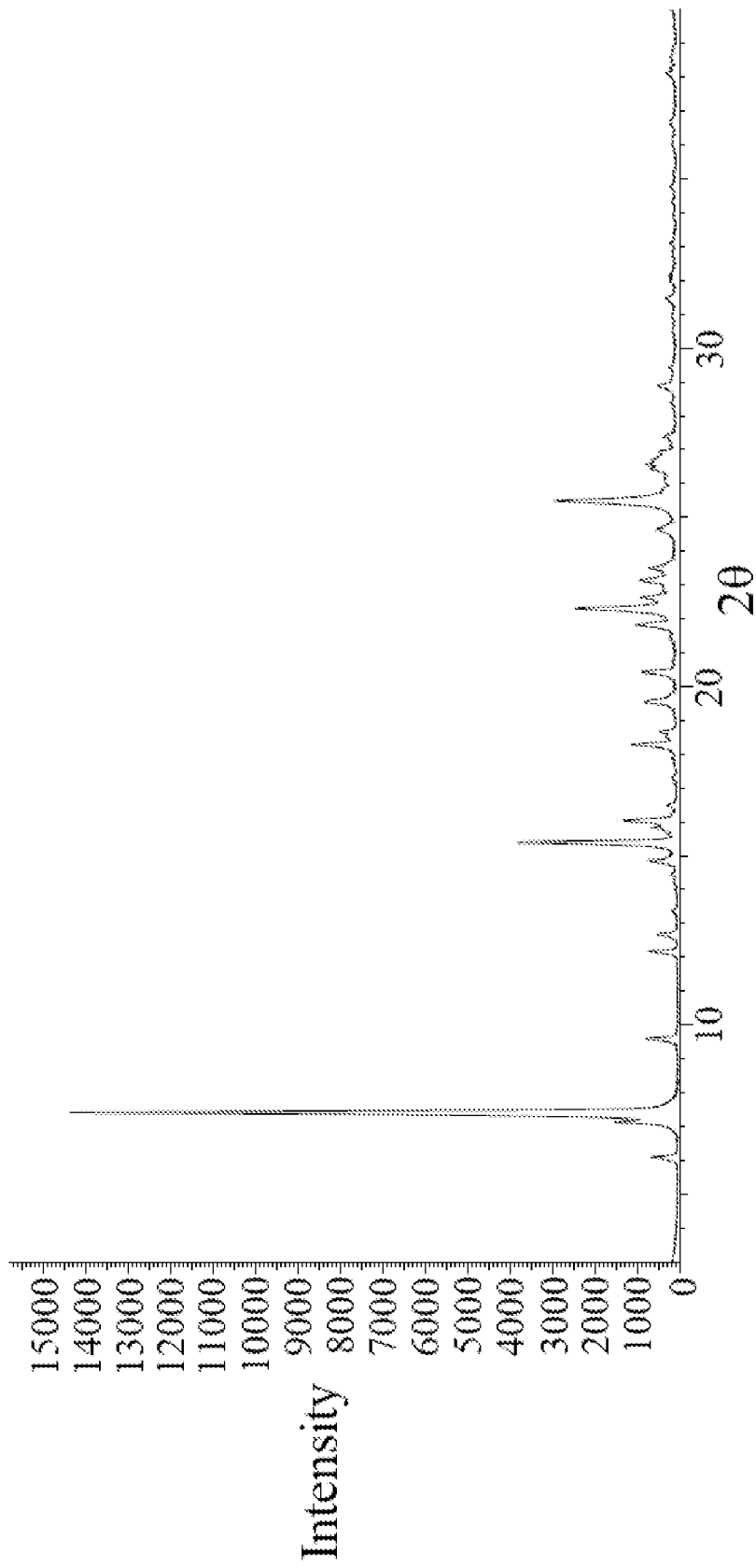
FIG. 4 is an XRPD pattern of the crystal form D of selumetinib sulfate according to an embodiment of the present invention.

Embodiment 8: Preparation of Crystal Form D of Selumetinib Sulfate 0.301 g of crystal form A was added with 6 mL of butanol and 6 mL of water. The temperature of the solution was raised while the solution was stirred, and complete dissolution did not occur until the temperature was 62° C., at which time the raising of temperature was stopped. A large amount of solid precipitated when the temperature was lowered to 52° C., and the solution was stirred for one hour while its temperature was kept in the range from 0° C. to 10° C. After that, suction filtration was performed on the solution, and the solid obtained was washed with 3 mL of water and then dried at 55° C. for 18 hours to produce 0.167 g of pale yellow solid, with the yield being 55.55% and the purity of the product being 98.01%. An XRPD pattern of the product is shown in FIG. 4.

Embodiment 9: Preparation of Crystal Form D of Selumetinib Sulfate 0.601 g of crystal form A was added with 12 mL of butanone, 6 mL of dichloromethane and 3 mL of water. The temperature of the solution was raised while the solution was stirred, and complete dissolution did not occur until the temperature was 55° C., at which time the raising of temperature was stopped. A large amount of solid precipitated when the temperature was lowered to 46° C., and the solution was stirred for one hour while its temperature was kept in the range from 0° C. to 10° C. After that, suction filtration was performed on the solution, and the solid obtained was washed with 6 mL of water and then dried at 55° C. for 21 hours to produce 0.277 g of pale yellow to white solid, with the yield being 46.22% and the purity of the product being 99.23%.

Figure 5:
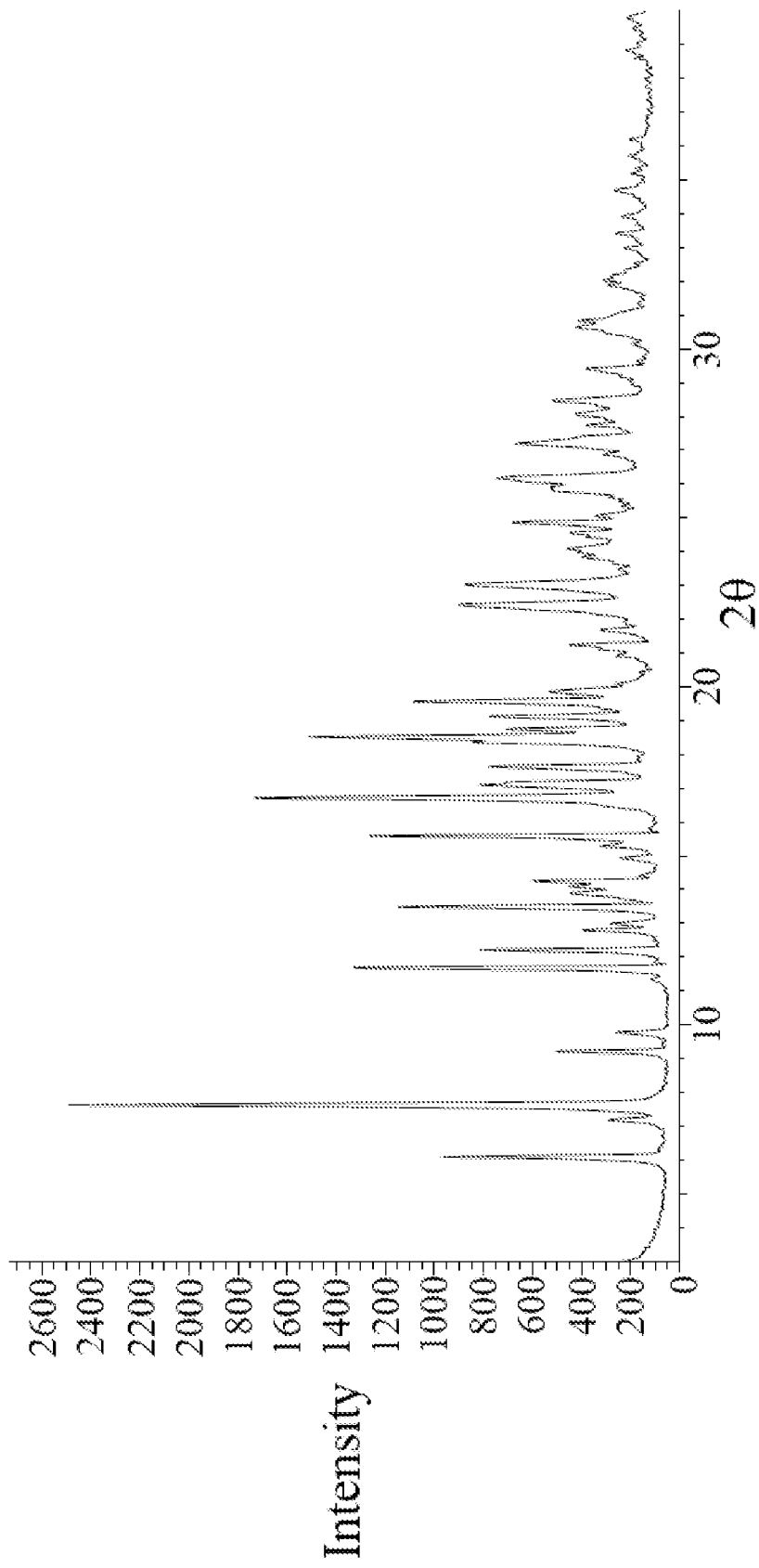
FIG. 5 is an XRPD pattern of the crystal form E of selumetinib sulfate according to an embodiment of the present invention.

Embodiment 10: Preparation of Crystal Form E of Selumetinib Sulfate 0.301 g of crystal form A was added with 6 mL of isopropyl alcohol and 6 mL of water. The temperature of the solution was raised while the solution was stirred, and complete dissolution did not occur until the temperature was 52° C., at which time the raising of temperature was stopped. A large amount of solid precipitated when the temperature was lowered to 24° C., and the solution was stirred for one hour while its temperature was kept in the range from 0° C. to 10° C. After that, suction filtration was performed on the solution, and the solid obtained was washed with 3 mL of water and then dried at 55° C. for 19 hours to produce 0.167 g of pale yellow solid, with the yield being 55.44% and the purity of the product being 98.11%. An XRPD pattern of the product is shown in FIG. 5.

Figure 6:
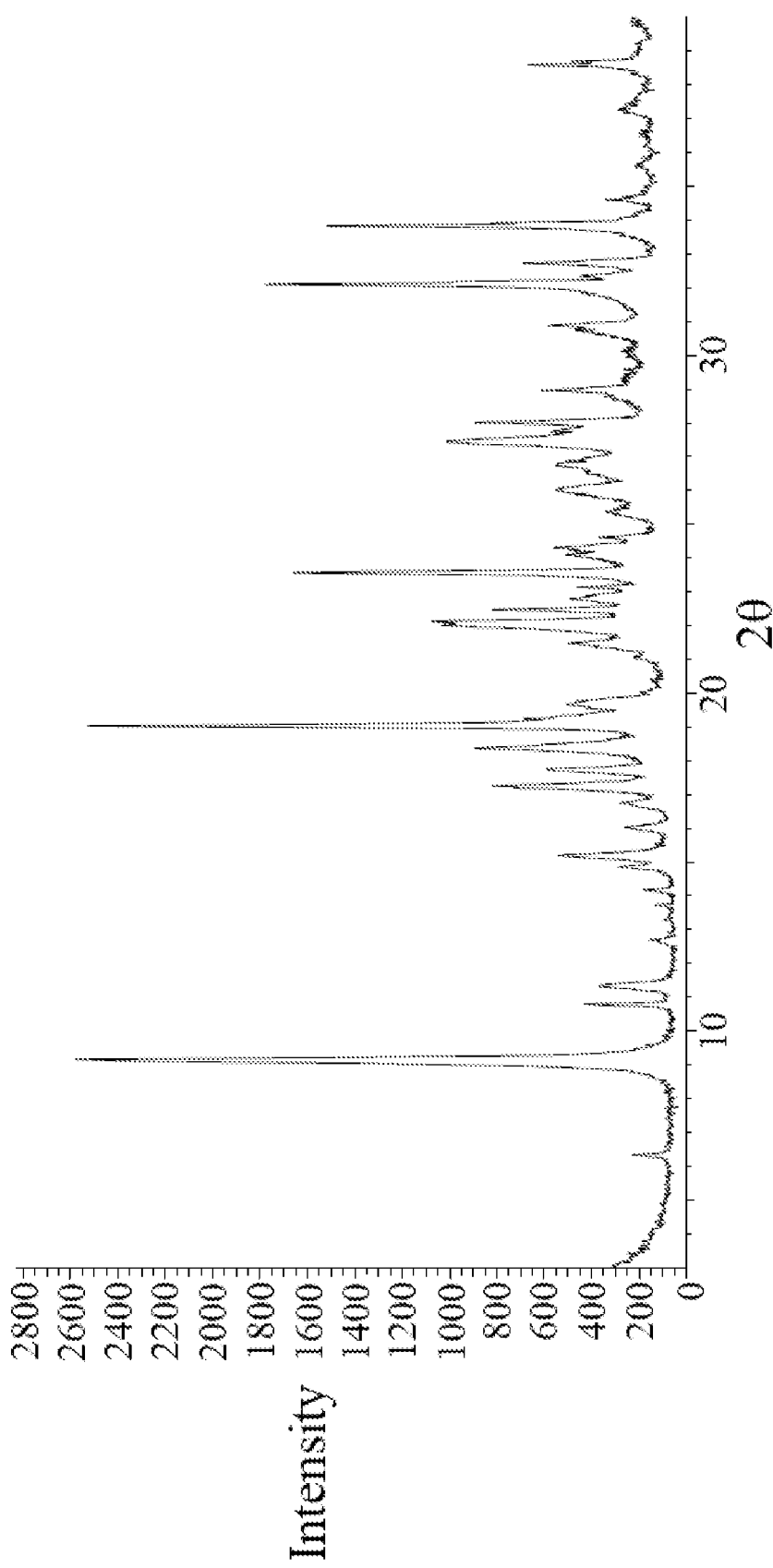
FIG. 6 is an XRPD pattern of the crystal form F of selumetinib sulfate according to an embodiment of the present invention.

Embodiment 11: Preparation of Crystal Form F of Selumetinib Sulfate 1.009 g of SEL-3 was added with 51.8 mL of ethanol and 5.2 mL of 2N hydrochloric acid. The solution was stirred for four hours at a temperature of 25° C. to 30° C. The pH value of the solution was then adjusted to 7.14 with a 2N sodium hydroxide solution. After two times of extractions with 20.2 mL of ethyl acetate and 20.2 mL of saturated salt solution and two times of concentrations of the ethyl acetate solution under reduced pressure, a solid intermediate was obtained. The solid intermediate was added with 6.1 mL of tetrahydrofuran and 0.8 mL of water, and the temperature of the resulting solution was lowered while the solution was stirred. 0.148 mL of sulfuric acid was added when the temperature was in the range from 1° C. to 3° C. Then the temperature was raised to 52° C. such that all the solid was dissolved. The temperature was not lowered until 30 minutes later. A large amount of solid precipitated when the temperature was reduced to 18° C., and the solution was stirred for one hour while its temperature was kept in the range from 0° C. to 10° C. 0.3969 g of pale yellow solid was obtained, with the yield being 33.40% and the purity of the product being 98.31%. An XRPD pattern of the product is shown in FIG. 6.

Figure 7:
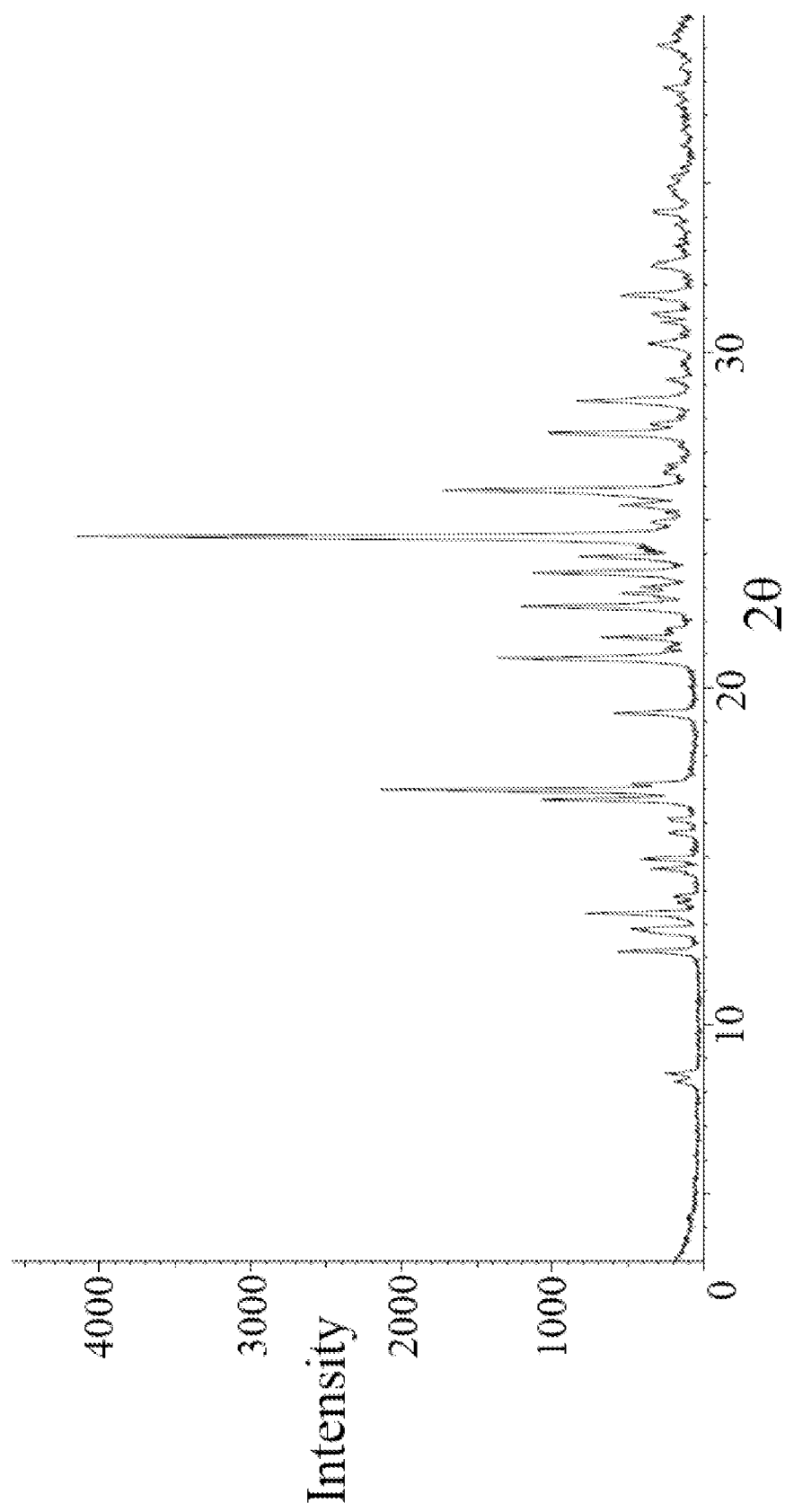
FIG. 7 is an XRPD pattern of the crystal form G of selumetinib sulfate according to an embodiment of the present invention.

Embodiment 11: Preparation of Crystal Form F of Selumetinib Sulfate 11.618 g of crystal form C was added with 79 mL of butanone and 13.36 mL of water. The temperature of the solution was lowered while the solution was stirred. When the temperature of the solution was lowered to 10° C., 10% V/V of sulfuric acid was added, and the solution was stirred for 20 minutes. Then, 118.5 mL of butanone was added into the solution, which was stirred for one hour while its temperature was kept in the range from 0° C. to 10° C. After that, suction filtration was performed on the solution, and the solid obtained was washed with 232 mL butanone and then dried at 55° C. for 16 hours to produce 12.124 g of pale yellow solid, with the yield being 85.91% and the purity of the product being 99.81%. An XRPD pattern of the product is shown in FIG. 7.

The characteristic peaks in the XRPD patterns of the foregoing crystal forms A to F of selumetinib sulfate are summarized in Table 1.

TABLE 1

| | | | 2θ | | | |
|---|---|---|---|---|---|---|
| Crystal form A | Crystal form B | Crystal form C | Crystal form D | Crystal form E | Crystal form F | Crystal form G |
| 6.19, 6.62, 9.64, 12.34, 13.19, 14.27, 14.90, 16.85, 17.60, 18.00, 21.17, 22.14, 22.75, 23.46, 24.85, 25.55, 26.53 | 8.56, 12.19, 12.87, 13.33, 13.85, 14.65, 14.96, 15.71, 16.11, 16.72, 16.99, 19.28, 20.90, 21.54, 22.45, 22.85, 23.45, 23.92, 24.92, 25.47, 25.90, 26.47, 27.60, 27.85, 28.57, 29.20, 30.25, 31.13, 31.71, 32.60, 33.82, 34.17, 34.86, 37.84, 39.15 | 6.76, 7.52, 9.39, 11.22, 11.84, 12.61, 13.52, 16.02, 17.28, 18.49, 18.83, 19.19, 20.34, 21.23, 21.99, 22.69, 23.39, 24.11, 25.01, 25.28, 25.87, 26.76, 27.23, 28.54, 29.44, 29.95, 30.53, 31.15, 31.60, 32.79, 33.80, 34.21, 35.08, 36.10, 36.56, 37.46, 38.70 | 6.09, 7.14, 7.42, 9.59, 12.17, 12.68, 13.35, 13.96, 14.27, 14.46, 14.85, 15.40, 15.84, 16.05, 16.51, 17.31, 17.76, 17.89, 18.29, 18.67, 19.55, 20.43, 21.46, 21.83, 22.32, 22.64, 23.15, 23.50, 24.65, 25.49, 26.57, 26.93, 27.38, 28.38, 28.89, 29.43, 30.52, 30.95, 31.46, 32.07, 32.79, 33.11, 33.94, 34.34, 34.77, 35.21, 36.10, 36.18, 36.70, 38.12, 38.62 | 6.09, 7.19, 7.63, 9.21, 9.77, 11.34, 11.69, 12.22, 12.85, 12.99, 13.49, 13.89, 14.25, 14.94, 15.30, 15.59, 16.72, 17.09, 17.64, 18.52, 18.75, 19.12, 19.57, 19.86, 21.24, 21.69, 22.43, 23.03, 23.85, 24.09, 24.55, 24.86, 25.03, 25.91, 26.18, 26.88, 27.20, 27.73, 28.06, 28.47, 29.41, 30.15, 30.73, 32.04, 32.98, 33.42, 33.93, 34.69, 35.17, 35.70, 36.19, 38.83, 39.80 | 6.34, 8.59, 9.17, 11.37, 12.19, 12.74, 13.33, 14.72, 14.90, 15.19, 16.03, 16.72, 16.99, 17.26, 17.72, 18.43, 19.04, 19.27, 19.72, 20.89, 21.47, 22.01, 22.45, 22.82, 23.14, 23.50, 24.04, 24.50, 25.44, 25.95, 26.50, 26.78, 27.44, 28.02, 28.63, 28.97, 29.25, 30.12, 30.68, 31.11, 31.79, 32.11, 33.84, 34.11, 35.63, 36.21, 36.58, 37.37, 38.61, 39.09 | 8.32, 8.55, 12.19, 12.79, 13.32, 13.62, 13.84, 14.65, 14.94, 15.71, 16.11, 16.70, 16.99, 19.27, 20.90, 21.51, 21.72, 22.44, 22.83, 23.43, 23.92, 24.51, 24.92, 25.44, 25.89, 26.41, 27.58, 27.84, 28.54, 29.17, 29.65, 30.22, 30.88, 31.13, 31.68, 32.58, 33.13, 33.78, 34.16, 34.76, 34.89, 35.19, 36.12, 36.58, 37.32, 37.86, 38.43, 39.10, 39.43 |

Test Example

The stability of crystal forms A, B, C, D, E, F and G of selumetinib sulfate was tested by placing the different crystal forms of selumetinib sulfate into a constant-humidity and constant-temperature cabinet, where the powder of each crystal form was exposed to a temperature of 80° C. and a relative humidity (RH) of 75%. The test results are shown in Table 2.

TABLE 2

| Type of crystal form | Crystal form prepared | 80° C. and 75% RH | |
|---|---|---|---|
| | | 1 day | 3 days |
| A | A | A turned into C | A turned into C |
| B | B | Remained B | Remained B |
| C | C | Remained C | Remained C |
| D | D | Remained D | Remained D |
| E | E | Remained E | Remained E |
| F | F | Remained F | Remained F |
| G | G | Remained G | Remained G |

According to Table 2, crystal form A of selumetinib sulfate turned into crystal form C under 80° C. and 75% RH, whereas crystal forms B, C, D, E, F and G of selumetinib sulfate remained unchanged under the same conditions. It can be inferred from the test results that crystal forms B, C, D, E, F and G of selumetinib sulfate can maintain their respective crystal forms when kept at a relatively high temperature and therefore have good storage and preservation properties advantageous to industrial preparation, and that crystal form A of selumetinib sulfate is difficult to preserve and therefore can be used as a raw material from which crystal forms C, D and E of selumetinib sulfate can be prepared. Further, crystal form C of selumetinib sulfate can be used as a raw material from which crystal form G of selumetinib sulfate can be prepared.

In summary, the efficacy of the present invention lies in the fact that the present invention disclosed seven different crystal forms of selumetinib sulfate and their respective preparation methods. The disclosed crystal forms and preparation methods are different from the crystal forms and preparation methods disclosed in Chinese Patent No. 101633645, Chinese Patent No. 101486682 and U.S. Pat. No. 9,156,795. The present invention uses sulfuric acid to remove the vinyl protecting group, so selumetinib sulfate can be obtained without having to neutralize the reactant mixture into a conjugate acid-free form. Furthermore, in contrast to the preparation method of the Chinese patents, in which the unnecessary reagent residues cannot be removed until a post-treatment such as a neutralization and extraction step is performed on the resulting SEL without a conjugate acid, the present invention removes the vinyl protecting group with sulfuric acid and takes advantage of the differences in solubility of the conjugate acid form in different organic solvents so that recrystallization can be carried out directly to obtain the desired crystal form. The preparation methods of the present invention not only include fewer steps than the prior art, but also can remove excessive impurities. Moreover, the disclosed crystal forms B, C, D, E, F and G of selumetinib sulfate are stable, can be easily stored and can each serve as an active pharmaceutical ingredient in a preparation, whereas the disclosed crystal form A of selumetinib sulfate can be used as a raw material to prepare the other crystal forms. The preparation methods of the invention can increase the yield of selumetinib sulfate in different crystal forms and contribute greatly to the pharmaceutical industry by using fewer reaction steps than the prior art to reduce the production cost and labor cost incurred in the preparation process.

The above has made a detailed description of the present invention, but the above mentioned is only one of the preferred examples of the present invention, and should not be used to limit the scope of the present invention, i.e., all changes and modifications made to the scope of the patent application of the present invention should still fall within the scope of the patent of the present invention.

What is claimed is:

1. A crystal form of selumetinib sulfate, which is crystal form A, B, C, D, E, F or G,
   wherein the crystal form A is characterized by having characteristic peaks at 2θ=6.62°±0.20°, 9.64°±0.20°, 12.34°±0.20°, 13.19°±0.20°, 18.00°±0.20°, 21.17°±0.20°, 22.14°±0.20°, 24.85°±0.20° and 26.53°±0.20° in an X-ray powder diffraction (XRPD) pattern,
   wherein the crystal form B is characterized by having characteristic peaks at 2θ=8.56°±0.20°, 12.19°±0.20°, 12.87°±0.20°, 13.33°±0.20°, 16.72°±0.20°, 16.99°±0.20°, 19.28°±0.20°, 20.90°±0.20°, 22.45°±0.20°, 24.52°±0.20°, 25.90°±0.20° and 27.60°±0.20° in an XRPD pattern,
   wherein the crystal form C is characterized by having characteristic peaks at 2θ=6.76°±0.20°, 7.52°±0.20°, 9.39°±0.20°, 11.22°±0.20°, 11.84°±0.20°, 13.52°±0.20°, 16.02°±0.20°, 18.83°±0.20°, 20.34°±0.20°, 23.39°±0.20° and 28.54°±0.20° in an XRPD pattern,
   wherein the crystal form D is characterized by having characteristic peaks at 2θ=6.17°±0.20°, 7.65°±0.20°, 9.79°±0.20°, 14.25°±0.20°, 16.41°±0.20°, 19.20°±0.20°, 22.89°±0.20°, 25.99°±0.20° and 27.22°±0.20° in an XRPD pattern,
   wherein the crystal form E is characterized by having characteristic peaks at 2θ=6.09°±0.20°, 7.63°±0.20°, 9.21°±0.20°, 9.77°±0.20°, 11.69°±0.20°, 12.22°±0.20°, 13.49°±0.20°, 15.59°±0.20°, 16.72°±0.20°, 17.09°±0.20°, 17.64°±0.20°, 18.52°±0.20°, 19.57°±0.20°, 22.43°±0.20°, 23.03°±0.20°, 26.18°±0.20° and 27.20°±0.20° in an XRPD pattern,
   wherein the crystal form F is characterized by having characteristic peaks at 2θ=9.17°±0.20°, 11.37°±0.20°, 12.19°±0.20°, 15.19°±0.20°, 16.72°±0.20°, 17.26°±0.20°, 19.04°±0.20°, 22.01°±0.20°, 24.50°±0.20°, 27.44°±0.20°, 28.02°±0.20°, 32.11°±0.20°, 33.84°±0.20° and 38.61°±0.20° in an XRPD pattern,
   wherein the crystal form G is characterized by having characteristic peaks at 2θ=12.19°±0.20°, 13.32°±0.20°, 16.70°±0.20°, 16.99±0.20°, 19.27±0.20°, 20.90°±0.20°, 21.51°±0.20°, 22.44°±0.20°, 22.83°±0.20°, 23.43°±0.20°, 23.92°±0.20°, 24.51°±0.20°, 25.44°±0.20°, 25.89°±0.20°, 27.58°±0.20°, 28.54°±0.20° and 31.68°±0.20° in an XRPD pattern.

2. The crystal form of selumetinib sulfate as claimed in claim 1, wherein the XRPD pattern of the crystal form A is essentially the same as shown in FIG. 1.

3. The crystal form of selumetinib sulfate as claimed in claim 1, wherein the XRPD pattern of the crystal form B is essentially the same as shown in FIG. 2.

4. The crystal form of selumetinib sulfate as claimed in claim 1, wherein the XRPD pattern of the crystal form C is essentially the same as shown in FIG. 3.

5. The crystal form of selumetinib sulfate as claimed in claim 1, wherein the XRPD pattern of the crystal form D is essentially the same as shown in FIG. 4.

6. The crystal form of selumetinib sulfate as claimed in claim 1, wherein the XRPD pattern of the crystal form E is essentially the same as shown in FIG. 5.

7. The crystal form of selumetinib sulfate as claimed in claim 1, wherein the XRPD pattern of the crystal form F is essentially the same as shown in FIG. 6.

8. The crystal form of selumetinib sulfate as claimed in claim 1, wherein the XRPD pattern of the crystal form G is essentially the same as shown in FIG. 7.

9. A method for preparing the crystal form of selumetinib sulfate as claimed in claim 1, comprises the steps of:
   adding the compound 6-(4-bromo-2-chloro-phenylamino)-7-fluoro-3-methyl-3H-benzimidazole-5-carboxylic acid (2-vinyloxy-ethoxy)-amide (SEL-3) into a first organic solvent to form a solution, increasing a temperature of the solution to enhance dissolution, then decreasing the temperature of the solution to facilitate crystallization and thereby obtaining the crystal form A of selumetinib sulfate, wherein the first organic solvent includes water, tetrahydrofuran and sulfuric acid, and the sulfuric acid has a concentration of 5%-15% V/V, or
   adding the compound 6-(4-bromo-2-chloro-phenylamino)-7-fluoro-3-methyl-3H-benzimidazole-5-carboxylic acid (2-vinyloxy-ethoxy)-amide (SEL-3)

into a second organic solvent to form a solution, increasing a temperature of the solution to enhance dissolution, then decreasing the temperature of the solution to facilitate crystallization and thereby obtaining the crystal form B of selumetinib sulfate, wherein the second organic solvent includes water, tetrahydrofuran and sulfuric acid, and the sulfuric acid has a concentration of 45%-55% V/V, or adding the compound 6-(4-bromo-2-chloro-phenylamino)-7-fluoro-3-methyl-3H-benzimidazole-5-carboxylic acid (2-vinyloxy-ethoxy)-amide (SEL-3) into a fourth organic solvent to form a first solution, adding the first solution into a fifth organic solvent to form a second solution; increasing a temperature of the second solution to enhance dissolution, then decreasing the temperature of the second solution to facilitate crystallization and thereby obtaining the crystal form F of selumetinib sulfate, wherein: the fourth organic solvent is ethanol and hydrochloric acid; and the fifth organic solvent is water and tetrahydrofuran.

10. A method for converting crystal forms of selumetinib sulfate, comprises the steps of: adding crystal form A of selumetinib sulfate into a third organic solvent and water to form a solution, increasing a temperature of the solution to enhance dissolution, then decreasing the temperature of the solution to facilitate crystallization and thereby obtaining crystal form C, D or E of selumetinib sulfate, wherein:

the crystal form C of selumetinib sulfate is obtainable when the third organic solvent is (1) acetone and dichloromethane, (2) butanone and isopropyl alcohol, (3) butanone and methanol, (4) butanone or (5) acetone;

the crystal form D of selumetinib sulfate is obtainable when the third organic solvent is (1) butanone and dichloromethane or (2) butanol; or the crystal form E of selumetinib sulfate is obtainable when the third organic solvent is isopropyl alcohol, or adding crystal form C of selumetinib sulfate into a sixth organic solvent and then into a seventh organic solvent, decreasing the temperature of the solution to facilitate crystallization and thereby obtaining crystal form G of selumetinib sulfate, wherein:

the sixth organic solvent is butanone, water and sulfuric acid, and the sulfuric acid has a concentration of 5%-15% V/V, and the seventh organic solvent is butanone.

* * * * *